United States Patent
Gloger et al.

(10) Patent No.: US 8,750,572 B2
(45) Date of Patent: Jun. 10, 2014

(54) METHOD FOR MONITORING AN ENVIRONMENT OF A VEHICLE

(75) Inventors: Joachim Gloger, Bibertal (DE); Thomas Ruland, Neu-Ulm (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/384,814

(22) PCT Filed: Jul. 20, 2010

(86) PCT No.: PCT/EP2010/004415
§ 371 (c)(1),
(2), (4) Date: Jan. 19, 2012

(87) PCT Pub. No.: WO2011/015283
PCT Pub. Date: Feb. 10, 2011

(65) Prior Publication Data
US 2012/0121136 A1 May 17, 2012

(30) Foreign Application Priority Data
Aug. 5, 2009 (DE) .......................... 10 2009 036 200

(51) Int. Cl.
*G06K 9/00* (2006.01)
(52) U.S. Cl.
USPC ............ 382/104; 382/284; 348/148; 348/187
(58) Field of Classification Search
USPC ........................... 382/104, 284; 348/148, 187
See application file for complete search history.

(56) References Cited

U.S. PATENT DOCUMENTS 5,670,935 A * 9/1997 Schofield et al. ............. 340/461
6,488,109 B1 * 12/2002 Igaki et al. .................... 180/169

(Continued)

FOREIGN PATENT DOCUMENTS

CN 1412047 A 4/2003
CN 1801216 A 7/2006

(Continued)

OTHER PUBLICATIONS

Davis, J., "Mosaics of scenes with moving objects," Computer Vision and Pattern Recognition, 1998. Proceedings. 1998 IEEE Computer Society Conference on , vol., No., pp. 354,360, Jun. 23-25, 1998.*

(Continued)

*Primary Examiner* — Stephen R Koziol
*Assistant Examiner* — Shaghayegh Azima
(74) *Attorney, Agent, or Firm* — Patent Central LLC; Stephan A. Pendorf

(57) ABSTRACT

A method for monitoring an environment (U) of a vehicle (F), wherein the environment (U) and objects (O1, O2) present therein are detected by means of at least a first image detection unit (1) and a second image detection unit (2), of which the detection regions overlap at least partially and form an overlap region, wherein an overall image (G) is produced from individual images detected by means of the image detection units (1, 2) by means of an image processing unit, the overall image (G) showing the vehicle (F) and its environment (U) from a bird's eye view. There is a progression of at least one boundary line (L1 to L3) which extends from an origin to the image edge of the overall image in such a way that the boundary line (L1 to L3) extends away from the objects (O1, O2).

4 Claims, 1 Drawing Sheet

(56) References Cited

U.S. PATENT DOCUMENTS

Figure 1:
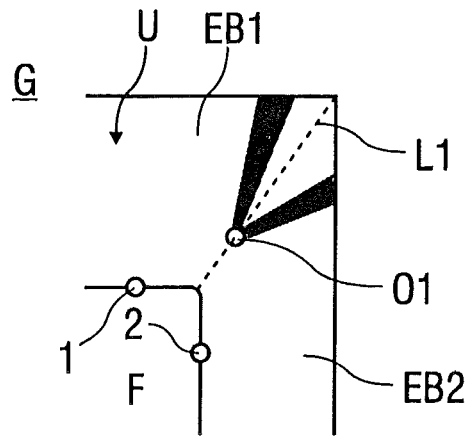

| | | |
|---|---|---|
| 7,423,521 B2 * | 9/2008 | Kukita et al. ............... 340/425.5 |
| 2003/0021490 A1 * | 1/2003 | Okamoto et al. ............. 382/284 |
| 2003/0085999 A1 * | 5/2003 | Okamoto et al. ............. 348/148 |
| 2006/0088190 A1 * | 4/2006 | Chinomi ....................... 382/104 |
| 2006/0187009 A1 * | 8/2006 | Kropinski et al. ............ 340/435 |
| 2006/0192660 A1 * | 8/2006 | Watanabe et al. ............. 340/435 |
| 2006/0210114 A1 * | 9/2006 | Oka et al. ....................... 382/104 |
| 2007/0003108 A1 * | 1/2007 | Chinomi et al. .............. 382/104 |
| 2008/0012940 A1 * | 1/2008 | Kanaoka et al. .............. 348/148 |
| 2008/0088190 A1 * | 4/2008 | Ideshio ........................... 310/71 |
| 2008/0198226 A1 * | 8/2008 | Imamura ........................ 348/148 |
| 2008/0231710 A1 * | 9/2008 | Asari et al. .................... 348/187 |
| 2009/0022423 A1 * | 1/2009 | Ehlgen et al. ................. 382/284 |
| 2010/0134325 A1 * | 6/2010 | Gomi et al. .............. 340/995.14 |
| 2011/0157361 A1 * | 6/2011 | Wu et al. ....................... 348/148 |

FOREIGN PATENT DOCUMENTS

| | | | |
|---|---|---|---|
| CN | 101102482 A | | 1/2008 |
| EP | 1696669 A1 | | 8/2006 |
| JP | 2006121587 A | | 5/2006 |
| JP | 2007089081 A | | 4/2007 |
| JP | 2007104373 | * | 4/2007 |
| JP | 2007104373 A | | 4/2007 |
| JP | 2007180720 A | | 7/2007 |
| JP | 2008048317 A | | 2/2008 |
| JP | 2008048345 A | | 2/2008 |
| WO | 2008150153 A1 | | 12/2008 |

OTHER PUBLICATIONS

H.Aghajan, A.Cavallaro,"Multi-camera networks principles and Applications", Elsevier Inc, a Jan. 2009.*

Yi-Yuan Chen; Yuan-Yao Tu; Cheng-Hsiang Chiu; Yi-Yuan Chen, "An embedded system for vehicle surrounding monitoring," Power Electronics and Intelligent Transportation System (PEITS), 2009 2nd International Conference on , vol. 2, No., pp. 92,95, Dec. 19-20, 2009.*

Davis J: "Mosaics of scenes with moving objects" IEEE Computer Society Conference on Computer Vision and Pattern Recognition, 1998. Proceedings. Santa Barbara, CA, USA Jun. 23-25, 1998, Jun. 23, 1998, pp. 354-360, XP010291602, Los Alamitos, CA, USA, IEEE Comput. Soc, US DOI: 10.1109/CVPR.1998.698630, ISBN: 978-0-8186-8497-5, Sekt 4, p. 358-p. 359.

Sevket Gumustekin: "An Introduction to Image Mosaicing" [Online] Jul. 1999, pp. 1-10, XP002605772 Retrieved from the Internet: URL:http://web.iyte.edu.tr/eee/sevgum/research/mosaicing99/> [retrieved on Oct. 19, 2010] Sekt. Image Compositing, p. 5.

H. Aghajan, A. Cavallaro: "Multi-Camera Networks Principles and Applications" Jan. 1, 2009, Elsevier Inc., United States, XP002605584 p. 14-p. 18 p. 100-p. 114.

* cited by examiner

METHOD FOR MONITORING AN ENVIRONMENT OF A VEHICLE

The invention relates to a method for monitoring an environment of a vehicle, wherein the environment and objects present therein are detected by means of at least a first image detection unit and a second image detection unit, the detection regions of which at least partially overlap and form an overlap region, wherein an overall image is produced from individual images detected by means of the image detection units, said overall image showing the vehicle and its environment from a bird's eye view.

Vehicles for transport of goods or persons are frequently characterised by large vehicle dimensions and/or limited clarity. This results in particular in manoeuvring with these vehicles being very difficult for a driver. It is thus advantageous to represent vehicles and their environment, in particular an environment behind or beside them, from a bird's eye view on a screen so that the vehicle and its whole environment are visible to the driver.

Different methods and devices are known from the prior art for such monitoring and representation of an environment of a vehicle, wherein an image of the vehicle and its environment is output from a bird's eye view for a driver of the vehicle. A better all-round view is thus created for the driver which serves for him as an assistance function and support during driving operation, for example during manoeuvring of the vehicle. Furthermore accidents can be avoided which frequently arise due to a poor all-round view, in particular with large vehicles which are difficult to oversee. An overall image with the representation of the vehicle and its environment is thereby determined from a bird's eye view from a plurality of picture images adjacent to each other or overlapping.

WO 2008/150153 A1 discloses a method for generating a panoramic view or all-round view onto a road edge. Laser scan data are thereby detected with a laser scanner as samples, wherein the laser scanner is arranged on a vehicle and position data and position determination data are assigned to each of the samples. Furthermore by means of a camera also arranged on the vehicle at least one image sequence is detected, wherein in turn position data and position determination data are assigned to each image of the image sequence in turn. A surface is determined from the laser scan data, wherein a position of the surface is determined in dependence upon the laser scan data and position determination data. The panoramic view or an all-round view is determined for said surface from at least one image sequence in dependence upon the position thereof and the position data and position determination data assigned to each of the images.

US 2006/0192660 A1 further discloses a device for displaying an environment of a vehicle. The device comprises a first detection unit which is arranged on a side of the vehicle and is provided to detect a first image. In addition a second detection unit is provided to detect a second image, wherein the second detection unit is arranged relative to the first detection unit thereof. Furthermore a display unit is provided for displaying the detected images and displaying the environment of the vehicle. By means of an image processing unit a boundary line is defined between the first and the second image in an overall image formed from these images in such a way that the boundary line is identical to a straight line which connects a position of the first camera and a position of the second camera to each other.

It is an object of the invention to indicate a method for monitoring an environment of a vehicle which has been improved in comparison with the prior art.

The object is achieved according to the invention with a method which has the features indicated in claim 1.

Advantageous embodiments of the invention are the object of the sub-claims.

In the method for monitoring an environment of a vehicle the environment and objects present therein are detected by means of at least a first image detection unit and a second image detection unit, the detection regions of which at least partially overlap and form an overlap region, wherein an overall image is produced from individual images detected by means of the image detection units using an image processing unit, said overall image showing the vehicle and its environment from a bird's eye view.

In order to represent objects situated in the overlap region, for example objects elevated from a base area such as persons, obstacles or other objects, in particular also in case of vehicles with a large vehicle length, completely and in their real form on the overall image, according to the invention in dependence upon determined positions of the objects in the overall image a course of a boundary line extending from an origin point to the image edge of the overall image is predefined variably so that the boundary line extends away from the objects.

In a particularly advantageous manner, when the adjacent individual image regions are put together to form the overall image from a bird's eye view, discontinuities arising in the overlap regions of the image detection units, in particular distortion and/or jump discontinuities, which can lead to a broken and incomplete representation of the objects, do not act negatively upon the representation of the objects in the overall image. In particular the incomplete and discontinuous representation of the objects in the overall image is avoided as, due to the variable predefinition of the boundary line with such a progression that said boundary line does not touch the objects, an optimal, i.e. complete and continuous, optical representation of the objects in the overall image is achieved.

Figure 2:
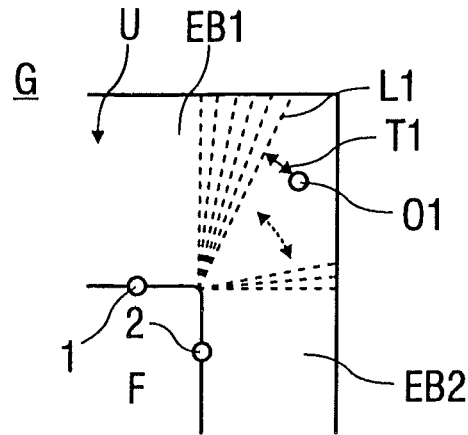
Figure 3:
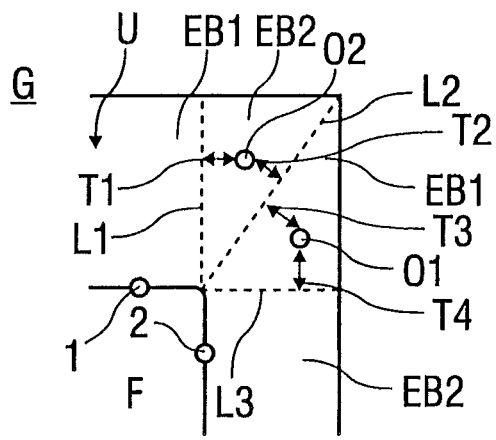
Figure 4:
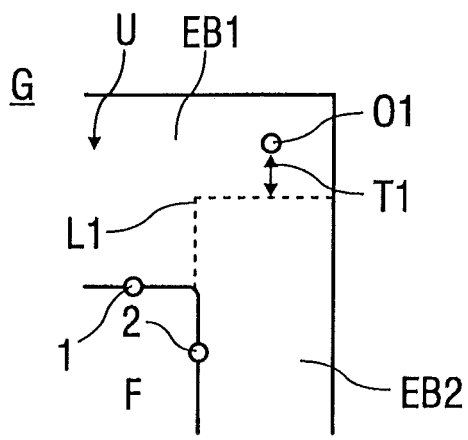
Figure 5:
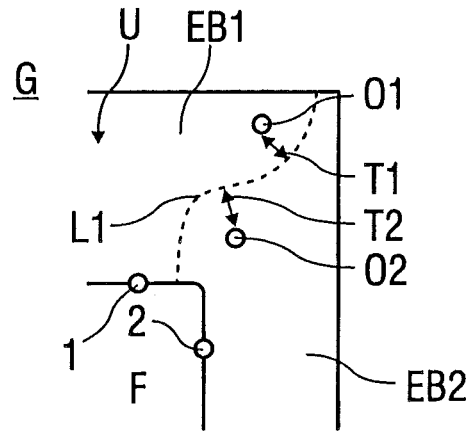

Example embodiments of the invention are explained in greater detail below using drawings, in which:

FIG. 1 shows, schematically, a cut-out of an overall image according to the prior art which shows a vehicle, its environment and an object from a bird's eye view;

FIG. 2 schematically, the cut-out of an overall image with a variably predefinable boundary line between a first and a second individual image region, FIG. 3 schematically, a sub-division of the overall image into a plurality of individual image regions, FIG. 4 schematically, a rectangular progression of the boundary line between the first individual image region and the second individual image region of the overall image, and FIG. 5 schematically, a curved progression of the boundary line between the first individual image region and the second individual image region of the overall image.

Corresponding parts are provided with the same reference numerals in all the figures.

FIG. 1 shows a cut-out of an overall image G according to the prior art which shows a vehicle F, its environment U and an object O1 from a bird's eye view.

At the front end of the vehicle F a first image detection unit 1 and at the right side of the vehicle F a second image detection unit 2 is arranged, by means of which the vehicle F and its environment U can be detected. Detection regions of the image detection units 1 and 2 thereby overlap at least partially.

The image detection units 1 and 2 are preferably cameras which have a large detection region. It can hereby be, besides conventional cameras, in particular omni-directional cameras. These can for example be mosaic-based cameras, rotating cameras, cameras with special wide angle lenses, so-called fisheye lenses or be based upon a catadioptric system.

The image detection units 1 and 2 detect individual images of the vehicle F, its environment U and the object O1, wherein these individual images are converted by means of an image processing unit which is not represented in greater detail into the overall image G. The overall image G shows the vehicle F, its environment and the object O1, wherein besides a person it can also be a question of obstacles or other objects, from the bird's eye view from an observation point. The individual images are thereby converted by means of the image processing unit using a projection of the individual images on a virtual reference plane.

In this virtual reference plane it is in particular a question of a plane which is arranged at the height of a travel path of the vehicle F, i.e. on the bottom which represents a base area.

As the object O1 which is raised from the base area, i.e. projects from this, is detected by the image detection units 1 and 2 from different perspectives it can lead to an optically broken and/or at least partially incomplete representation of the object O1 in the overall image G if the object O1 is in the region of the boundary line L or directly on it, wherein the boundary line L separates a first individual image region EB1 projected by means of the first image detection unit 1 and onto the reference plane from a second individual image region EB2 projected by means of the second image detection unit 2 and onto the reference plane.

In order to avoid the optically broken and/or at least partially incomplete representation of the object O1 in the overall image G a progression of the boundary line L1 is predefined in dependence upon a determined position of the object O1 in the overall image G in such a way that the boundary line extends away from the object O1.

FIG. 2 shows such progressions of the boundary line L1 away from the object O1, wherein the boundary line L1 extends constantly so that the object O1 is not intersected or contacted by it.

For such a definition of the progression of the boundary line L1 initially the position of the object O1 in the environment of the vehicle F is determined, whereby this takes place by means of the image detection units 1 and 2 and the image processing unit. From this position of the object O1 in the environment of the vehicle F and the known orientation of the image detection units 1, 2 it is subsequently determined in which position the object O1 is represented in the overall image G.

In dependence upon this position of the object O1 in the overall image G the individual image regions EB1 and EB2 are calculated upon generation thereof using the image processing unit in such a way that the boundary line extends away from the object O1. This variable progression of the boundary line L1 is possible in that the image detection units 1, 2 are orientated in such a way that the overlap region is produced between the detection regions so that in the overlap region the environment U and the object O1 situated therein are detected by both image detection units 1, 2.

In the embodiment shown the boundary line L1 is formed as a straight line which is pivoted in such a way about its origin in a front corner of the vehicle F that it does not contact the object O1.

In addition a tolerance region T1 is formed between the boundary line L1 and the object O1. An optimal representation of the vehicle F, its environment U and the object O1 on the overall image G is thus ensured constantly, in particular also upon movement of the vehicle F and the object O.

FIG. 3 shows the overall image G with the vehicle F, its environment U and two objects O1, O2, wherein the overall image G is repeatedly divided. In order to represent both objects O1, O2 without defects on the overall image G the first individual image region EB1 is shown interrupted on the overall image G in such a way through the second individual image region EB2 that the object O2 is shown in the second individual image region EB2 but is surrounded on the edge side by the first individual image region EB1.

In addition the second individual image region EB2 is also shown interrupted by the first individual image region EB1 in such a way that the first object O1 is shown in the first individual image region El but is surrounded on the edge side by the second individual image region EB2.

In other words: There is a change over the area of the overall image G repeatedly between the individual image regions EB1 and EB2.

The individual image regions EB1, EB2 are thereby separated from each other respectively by boundary lines L1 to L3, wherein the boundary lines L1 to L3 in turn run so that they do not contact the objects O1, O2 and tolerance regions T1 to T4 formed between the boundary lines L1 to L3 and the objects O1, O2. The progression of the boundary lines L1 to L3 results in an optimal representation of the objects O1, O2, as these are represented in the perspective of the respective image detection unit 1, 2, in which they are clearly and completely detected without error.

FIG. 4 shows a further progression of the boundary line L1 between the origin at the front corner of the vehicle F and the image edge of the overall image G. The boundary line L1 thereby extends so that it represents a partial section of a rectangle, whereby the object O1 is in the overall image G above the boundary line L1 and the tolerance region T1 is formed between the object O1 and the boundary line L1.

In further developments not shown in greater detail the boundary line can also extend in the manner of a polygon around one or more objects so that an optimal and complete representation of the objects using the overall image G is constantly possible.

FIG. 5 shows an overall image G which shows the vehicle F, its environment U and the objects O1 and O2, wherein the boundary line L1 extends in a curve in such a way that the first object O1 extends in the first individual image region EB1 above the boundary line L1 and the second object O2 below the boundary line L1 in the overall image G. Furthermore the origin of the boundary line L1 is offset from the front corner of the vehicle F at the front thereof in the direction of the first image detection unit 1 so that a modified virtual observation point is produced on the overall image G. A further improvement in the representation of the objects O1, O2 is thereby achieved.

The invention claimed is:

1. A method for monitoring an environment (U) of a vehicle (F), comprising:

detecting the environment (U) and objects (O1, O2) present therein by means of at least a first image detection unit (1) and a second image detection unit (2), the detection regions of which at least partially overlap and form an overlap region, forming a respective tolerance region around each detected object (O1, O2), producing an overall image (G) from individual images detected by means of the image detection units (1, 2), said overall image (G) showing the vehicle (F) and its environment (U) from a bird's eye perspective, and adjusting, depending upon determined positions of the objects (O1, O2) and tolerance region around the detected objects (O1, O2) in the overall image (G) between a first individual image region (EB1) and a second individual image region (EB2), a progression of at least one boundary line (L1 to L3) extending from an origin to the image edge of the overall image (G) so that the boundary line (L1 to L3) avoids the objects (O1, O2) and the tolerance regions around the detected objects (O1, O2).

2. The method according to claim 1, wherein the boundary line (L1 to L3) is drawn such that one of the objects (O1) is represented in the first individual image region (EB1) and the other of the objects (O2) is represented in the second individual image region (EB2).

3. The method according to claim 1, wherein a virtual observation point onto the overall image (G) is predefined variably in dependence upon the positions of the objects (O1, O2).

4. The method according to claim 1, wherein the overall image (G) is subdivided in dependence upon the positions of the objects (O1, O2) in such a way that an individual image region (EB1, EB2) of one of the image detection units (1, 2) is shown interrupted through at least one individual image region (EB1, EB2) of the respective other image detection unit (1, 2).

* * * * *